June 13, 1933.   C. L. KENNEDY   1,913,886

DRIVE SHAFT

Filed Nov. 8, 1930

Witness
Paul F. Bryant

Inventor
Carlton L. Kennedy
by his attorneys
Van Everen, Fish, Hildreth & Cary

Patented June 13, 1933

1,913,886

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

DRIVE SHAFT

Application filed November 8, 1930. Serial No. 494,387.

The present invention relates to drive shafts and more particularly to shafts for transmitting power from a motor or driving member having variable torque characteristics.

A variable torque motor such as the conventional single phase induction motor, tends to set up mechanical vibrations because of the non-uniform or pulsating rotation of the armature. The vibrations are accentuated when the motor is used to drive a load which has a natural period of vibration approximately the same as the period of pulsations of the motor torque. The vibrations may become particularly objectionable with a fan load, or any load in which the torque and speed vary together in a definite relation. In such cases, the vibration not only generates a highly objectionable noise, but may result in mechanical weakening of the parts.

The object of the present invention is to provide means for avoiding conditions whereby objectionable vibration may be set up by virtue of the transmission of pulsations from a variable torque motor to a load.

With this object in view, the present invention consists of certain novel features of construction, combinations and arrangement of parts hereinafter described and particularly defined in the claims.

Figure 1:
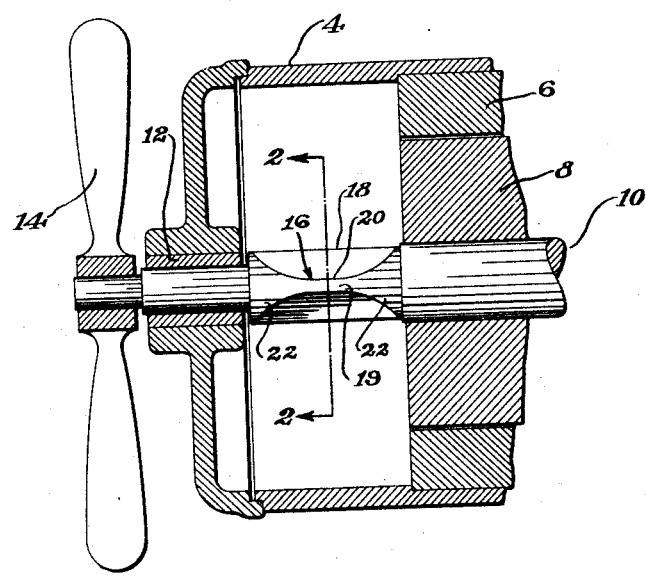
Figure 2:
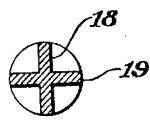

In the accompanying drawing illustrating the preferred form of the invention, Fig. 1 is a sectional elevation of a combined motor and fan; and Fig. 2 is a section of line 2—2 of Fig. 1.

The illustrated embodiment of the invention comprises a motor having a casing 4, a stator 6, and a rotor 8 mounted on a shaft 10. The motor may be of any usual or preferred type, but is herein described as a single phase induction motor which, as is well known, develops a considerable pulsation in torque at a frequency which is twice the frequency of the alternating current supply. The shaft 10 is mounted in suitable bearings, one of which is indicated at 12, supported in the casing of the motor. The shaft 10 protrudes beyond the casing and carries at its outer end a fan 14, which is keyed to the shaft.

A portion 16 of the shaft between the rotor 8 and the bearing 12 is formed in the shape shown in the drawing, that is, with portions milled away to leave a pair of fins or arms 18 in one radial plane, and another pair of fins or arms 19 in a radial plane at right angles thereto. The fins 18 are of uniform thickness; and the fins 19 are of varying thickness, as shown in Fig. 1, having a central parallel-sided portion 20 of the same thickness as the fins 18, and arcuate ends 22. The shaft may be formed by simple milling operations, with a straddle milling cutter which cuts on opposite sides of the fin 18. The cutter is entered into and removed from engagement with the shaft in parallel to the plane of the fin 18, thereby forming the arcuate ends 22 of the fin 19, the central flat portion 20 being formed by movement of the cutter longitudinally of the shaft.

The cross-section of the portion 16 of the shaft at the center thereof is a symmetrical cross, as shown in Fig. 2. In the preferred construction, for a small fan motor, the minimum thickness of the fins is approximately one-eighth the diameter of the portion 16 of the shaft. This section gives sufficient resistance to bending stresses to support the rotor with the proper clearance. By virtue of the non-circular section, however, the resistance to torsion is diminished to a much greater extent than the resistance to bending. The shaft therefore satisfactorily performs the function of supporting the parts, while acting to cushion any variable torsional impulses tending to be imparted to the load because of the non-uniform rotation of the rotor.

In operation, the motor generates a pulsating torque which varies in a complete cycle back to maximum for each half cycle of the alternating current supply. When an ordinary inflexible shaft is used, these variations are transmitted to the fan and cause similar variations in the speed of rotation. The fan load has the characteristic of varying in speed in proportion to the square root of the driving torque. The speed of the fan therefore pulsates at a frequency which is twice the line frequency, and if the fan has a natural vibration frequency nearly equal to the frequency of the speed variation, or to some harmonic thereof, the fan will give rise to vibrations of considerable amplitude. These vibrations not only manifest themselves as an objectionable noise, but may actually weaken the parts, as by loosening the fan rivets and causing wear on the bearings, as well as crystallization of the shaft.

According to the present invention, however, the shaft undergoes variable degrees of twisting, thereby acting as a cushion to absorb the variations in torque and to prevent their transmission to the fan. The fan, therefore, is permitted to operate at a practically uniform speed so that any variations in torque which may be set up by the motor do not permit a sufficient variation in fan speed to bring about objectionable resonance conditions of vibration. Accordingly, the system operates with a minimum of vibration and noise.

Although the invention has been herein described as embodied in a combined motor and fan, it will be understood that the invention may be applied to any type of motor or load wherein variable torque or variable speed characteristics give rise to resonant vibrations.

Having thus described the invention, what is claimed is:

1. A pulsating torque motor having, in combination, a rotor, a bearing, a shaft supporting the rotor and journaled in the bearing, a portion of the shaft extending only between the rotor and the bearing being cross-shaped in section to afford diminished resistance to torsional stresses.

2. A pulsating torque motor having, in combination, a rotor, a bearing, a shaft supporting the rotor and journaled in the bearing, a portion of the shaft being cross-shaped in section to afford diminished resistance to torsional stresses, said cross-shaped portion being entirely disposed beyond the rotor.

In testimony whereof I have signed my name to this specification.

CARLTON L. KENNEDY.